(12) United States Patent
Won et al.

(10) Patent No.: US 12,451,040 B2
(45) Date of Patent: Oct. 21, 2025

(54) DISPLAY DEVICE TO DISPLAY THREE-DIMENSIONAL IMAGES AND METHOD OF OPERATING THE SAME

(71) Applicant: SAMSUNG DISPLAY CO., LTD., Yongin-si (KR)

(72) Inventors: Byeong Hee Won, Yongin-si (KR); Young Soo Hwang, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/435,715

(22) Filed: Feb. 7, 2024

(65) Prior Publication Data

US 2024/0339060 A1    Oct. 10, 2024

(30) Foreign Application Priority Data

Apr. 6, 2023 (KR) .................. 10-2023-0045612

(51) Int. Cl.
*G09G 3/20* (2006.01)

(52) U.S. Cl.
CPC ....... *G09G 3/20* (2013.01); *G09G 2300/0452* (2013.01); *G09G 2300/0842* (2013.01); *G09G 2320/028* (2013.01); *G09G 2354/00* (2013.01)

(58) Field of Classification Search
CPC ...................................................... G09G 3/20
USPC ........................................................... 345/156
See application file for complete search history.

(56) References Cited

U.S. PATENT DOCUMENTS

| 7,786,962 B2 * | 8/2010 | Uehara | G02B 30/30 345/87 |
|---|---|---|---|
| 11,095,872 B2 * | 8/2021 | Park | G09G 3/003 |
| 2016/0323570 A1 | 11/2016 | Kim et al. | |
| 2023/0328221 A1 | 10/2023 | Won et al. | |

FOREIGN PATENT DOCUMENTS

| KR | 10-2018-0049294 A | 5/2018 |
| KR | 10-2018-0075293 A | 7/2018 |
| KR | 10-2396289 B1 | 5/2022 |
| KR | 10-2023-0136793 A | 9/2023 |

* cited by examiner

*Primary Examiner* — Calvin C Ma
(74) *Attorney, Agent, or Firm* — F. CHAU & ASSOCIATES, LLC

(57) ABSTRACT

A display device includes an optical member including a plurality of three-dimensional lenses, a display module coupled to the optical member, and a main controller. The display module includes a display panel including a plurality of sub-pixels and a storage device configured to store offset data representing a relative arrangement position between the three-dimensional lenses and the sub-pixels. The main controller is configured to receive the offset data from the display module by accessing the display module in a power-on mode, and correct image data to be provided to the display module, based on the offset data.

18 Claims, 11 Drawing Sheets

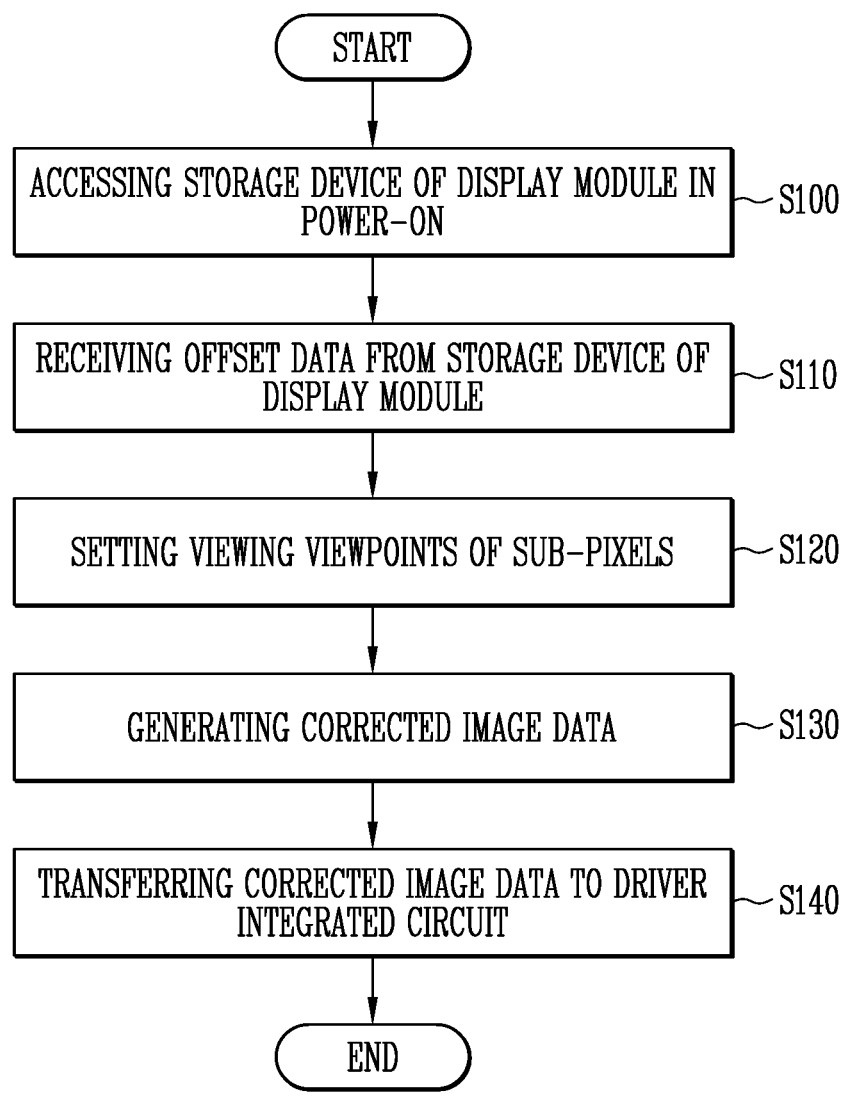

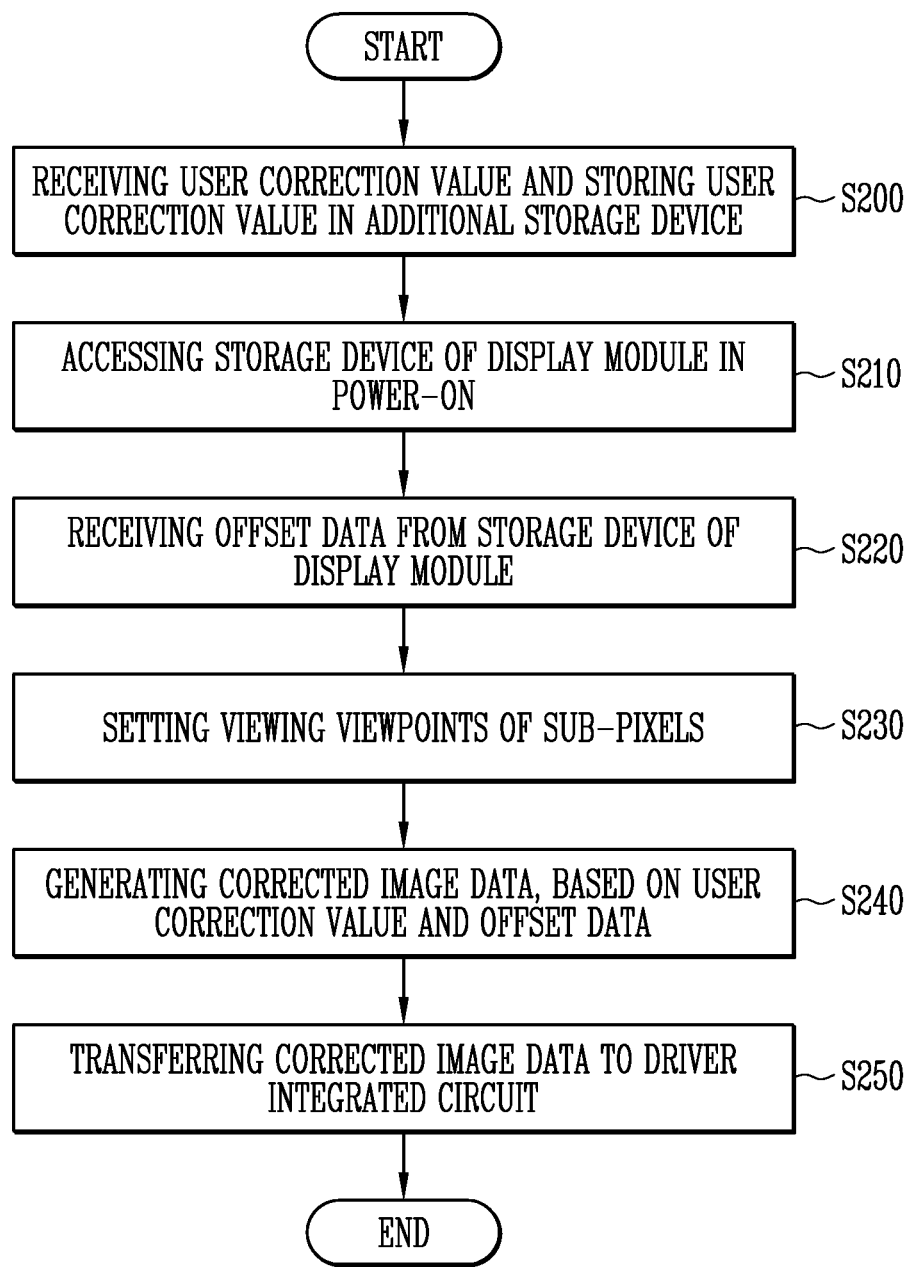

DISPLAY DEVICE TO DISPLAY THREE-DIMENSIONAL IMAGES AND METHOD OF OPERATING THE SAME

CROSS-REFERENCE TO RELATED APPLICATION

This application claims priority under 35 U.S.C. § 119 to Korean Patent Application No. 10-2023-0045612, filed on Apr. 6, 2023 in the Korean Intellectual Property Office, the disclosure of which is incorporated by reference herein in its entirety.

TECHNICAL FIELD

Embodiments of the present disclosure generally relate to a display device capable of displaying three-dimensional images, and a method of operating the same.

DISCUSSION OF RELATED ART

Recently, a three-dimensional image display device which displays an image of a display panel while dividing the image in a space at the front of the display panel by using an optical member and a viewing angle control display device have been developed.

The three-dimensional image display device displays an image while dividing the image into a left eye image and a right eye image so as to allow a user to feel a three-dimensional effect according to a binocular disparity. The three-dimensional display device is divided into a stereoscopic technique and an auto stereoscopic technique. The stereoscopic technique uses a parallax image of left and right eyes, which has a high three-dimensional effect, and is classified into a glass type and a glassless type. In the glass type, left and right parallax images are displayed by changing polarizations of the left and right parallax images, and a three-dimensional image is implemented using polarization glasses or using shutter glasses.

In the glassless type, an optical member including a parallax barrier, a lenticular sheet, and the like is formed in a display device, and optical axes of left and right parallax images are separated from each other, thereby implementing a three-dimensional image. The three-dimensional image display device may be manufactured using a bonding device which bonds the display panel and the optical member to each other.

SUMMARY

Embodiments provide a display device capable of displaying a three-dimensional image with increased reliability, and a method of operating the display device. For example, according to embodiments, the display device includes a display module and an optical member coupled to the display module, and offset data for compensating for an alignment error between the display module and the optical member may be provided.

In accordance with an embodiment of the present disclosure, a display device includes an optical member including a plurality of three-dimensional lenses, and a display module coupled to the optical member, the display module including a display panel including a plurality of sub-pixels and a storage device configured to store offset data representing a relative arrangement position between the three-dimensional lenses and the sub-pixels. The display device further includes a main controller configured to receive the offset data from the display module by accessing the display module in a power-on mode, and correct image data to be provided to the display module, based on the offset data.

In an embodiment, the display device may further include an additional storage device disposed outside of the display module and connected to the main controller. The main controller may include an input interface through which a user correction value is received from a user. The main controller may store the user correction value in the additional storage device, and correct the image data, based further on the user correction value.

In an embodiment, the main controller may receive the user correction value through the input interface while the display panel displays an image.

In an embodiment, the main controller is further configured to calculate viewing viewpoints of the sub-pixels according to the offset data, generate corrected image data by correcting the image data according to position coordinates and the viewing viewpoints of the sub-pixels, and transfer the corrected image data to the display module such that a three-dimensional image according to the corrected image data is displayed on the display panel.

In an embodiment, the sub-pixels may be arranged in a first direction and a second direction intersecting the first direction. The offset data may include, as the relative arrangement position, a slope angle of the three-dimensional lenses with respect to the first direction and a distance by which the three-dimensional lenses are shifted from a reference position.

In an embodiment, the main controller is further configured to calculate viewing viewpoints of the sub-pixels according to the relative arrangement position, generate corrected image data by correcting the image data according to position coordinates and the viewing viewpoints of the sub-pixels, and transfer the corrected image data to the display module.

In accordance with an embodiment of the present disclosure, a method of operating a display device including a plurality of sub-pixels includes accessing a storage device of a display module which stores offset data representing a relative arrangement position between a plurality of three-dimensional lenses and the sub-pixels in a power-on mode, receiving the offset data from the display module, correcting image data to be provided to the display module, based on the offset data, and displaying a three-dimensional image according to the corrected image data by transferring the corrected image data to the display module.

In an embodiment, the method may further include receiving a user correction value associated with the offset data from a user, and storing the user correction value. Correcting the image data may further be based on the user correction value.

In an embodiment, the user correction value may be received while the sub-pixels display an image.

In an embodiment, the sub-pixels may be arranged in a first direction and a second direction intersecting the first direction. The offset data may include, as the relative arrangement position, a slope angle of the three-dimensional lenses with respect to the first direction and a relative position of the three-dimensional lenses with respect to the sub-pixels.

In an embodiment, correcting the image data may include calculating viewing viewpoints of the sub-pixels according to the relative arrangement position, and generating the corrected image data by correcting the image data according to position coordinates and the viewing viewpoints of the sub-pixels.

In an embodiment, the three-dimensional image is displayed by applying data voltages corresponding to the corrected image data to the sub-pixels.

In accordance with an embodiment of the present disclosure, a method of displaying a three-dimensional image on a display device includes obtaining image data, and correcting the image data based on offset data. The offset data represents a relative arrangement position between a plurality of three-dimensional lenses of the display device and a plurality of sub-pixels of the display device when the display device is powered on. The method further includes displaying the three-dimensional image according to the corrected image data.

BRIEF DESCRIPTION OF THE DRAWINGS

The above and other features of the present disclosure will become more apparent by describing in detail embodiments thereof with reference to the accompanying drawings.

FIG. 10 is a flowchart illustrating an embodiment of a driving method of the main controller shown in FIG. 3.

FIG. 11 is a flowchart illustrating an embodiment of a driving method of the main controller shown in FIG. 4.

DETAILED DESCRIPTION

Figure 1:
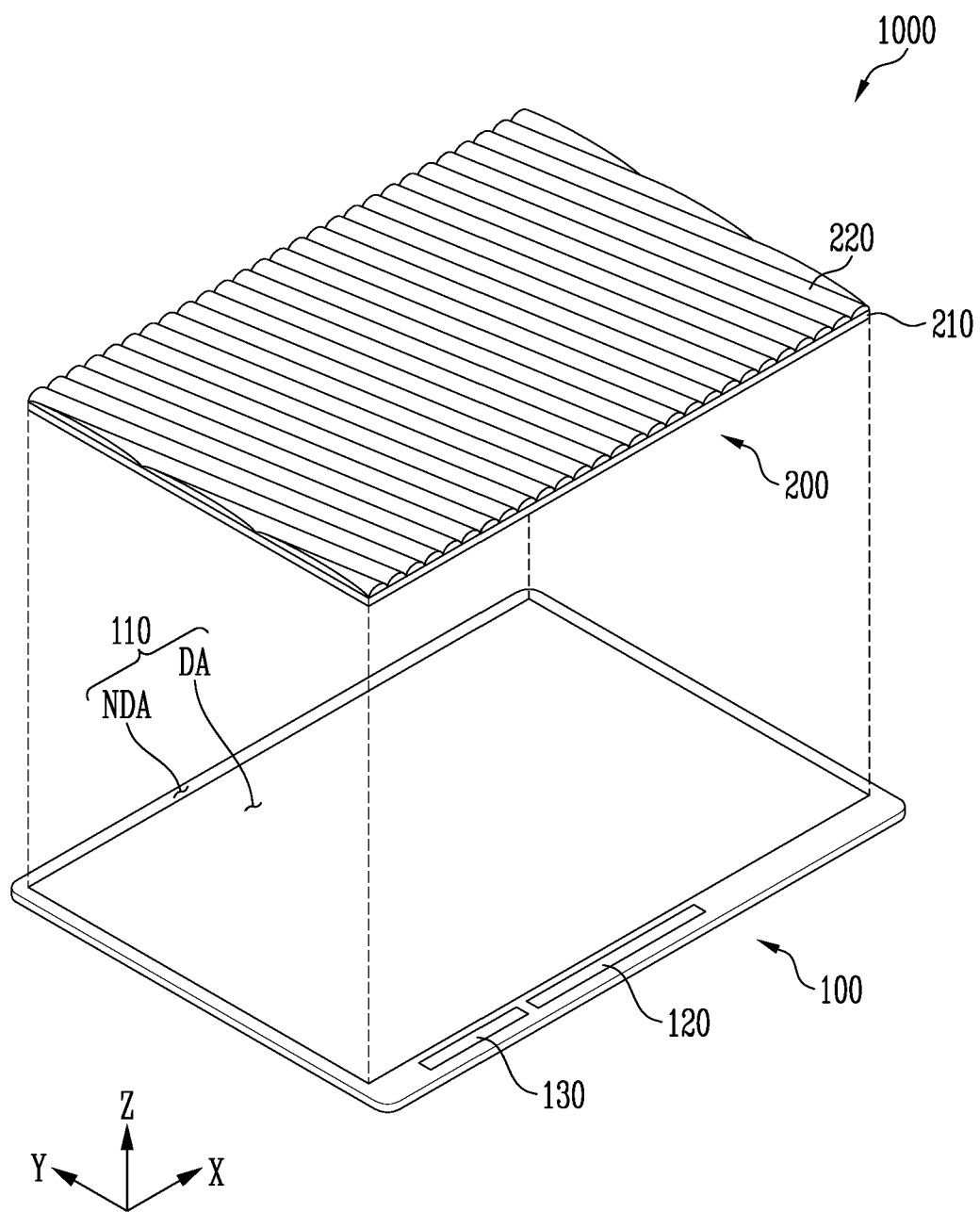
FIG. 1 is an exploded perspective view illustrating a display device in accordance with an embodiment of the present disclosure.

Embodiments of the present disclosure will be described more fully hereinafter with reference to the accompanying drawings. Like reference numerals may refer to like elements throughout the accompanying drawings It will be understood that when a component such as a film, a region, a layer, etc., is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. Other words used to describe the relationships between components should be interpreted in a like fashion.

It will be understood that when a component "includes" an element, unless there is another opposite description thereto, it should be understood that the component does not exclude another element but may further include another element. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

It will be understood that, although the terms "first", "second," etc. may be used herein to describe various elements, these elements should not be limited by these terms. These terms are only used to distinguish one element from another element. Thus, a "first" element discussed below could also be termed a "second" element without departing from the teachings of the present disclosure.

Spatially relative terms, such as "below," "above," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

Figure 2:
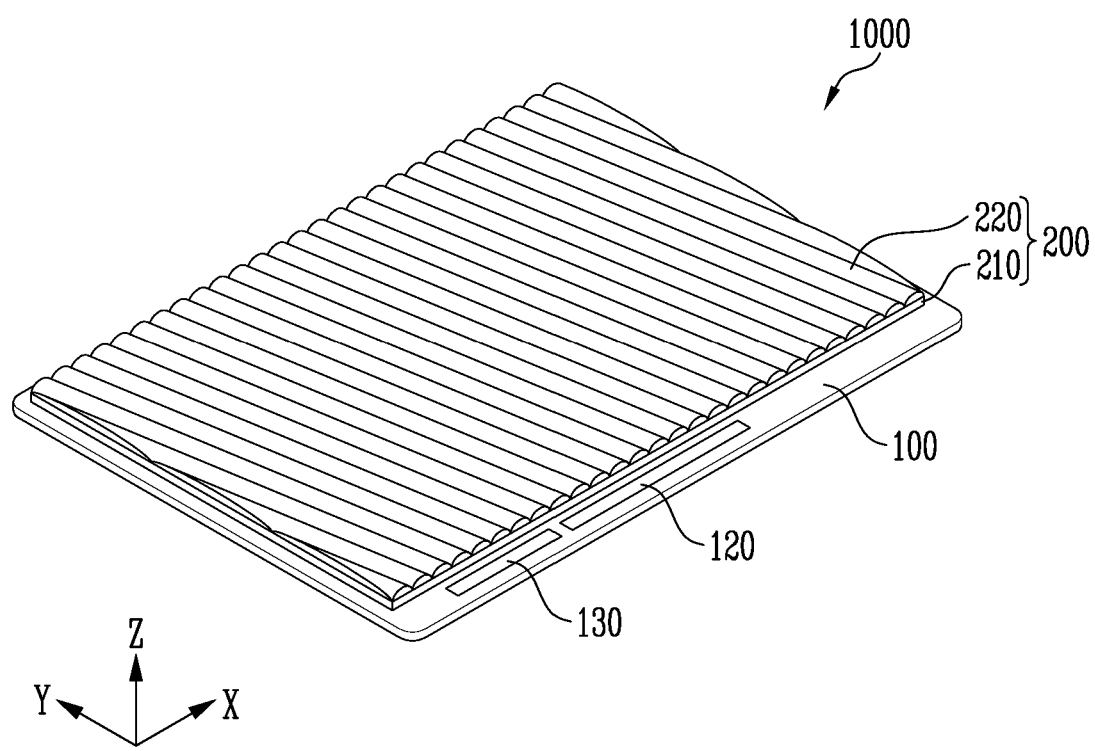
FIG. 2 is a perspective view illustrating the display device shown in FIG. 1, in which a display module and an optical member are coupled to each other.

FIG. 1 is an exploded perspective view illustrating a display device in accordance with an embodiment of the present disclosure. FIG. 2 is a perspective view illustrating the display device shown in FIG. 1, in which a display module and an optical member are coupled to each other.

Referring to FIGS. 1 and 2, a display device 1000 may be a three-dimensional image display device including a display module 100 and an optical member 200. The display module 100 may also be referred to herein as a display device. The three-dimensional image display device displays an image while dividing the image into a left eye image and a right eye image toward the front of the display device 1000 so as to allow a user to experience a three-dimensional effect according to a binocular disparity. Moreover, the three-dimensional image display device may provide an image while dividing the image into a plurality of viewing angle images toward the front of the display device 1000.

In embodiments, the three-dimensional image display device may be, for example, a light field display device in which the optical member 200 is disposed at the front of the display module 100, thereby allowing different image information to be viewed by both eyes of a viewer. The light field display device may generate a light field via the display module 100 and the optical member 200, thereby creating a three-dimensional image. For example, a ray generated in each pixel of the display module 100 of the light field display device may form a light field facing in a specific direction (specific viewing angle and/or specific time) via three-dimensional lenses of the optical member 200. Accordingly, three-dimensional image information corresponding to the specific direction can be provided to the viewer.

The display module 100 may include a display panel 110, a driver integrated circuit 120, and a storage device 130. The display panel 110 may include a display area DA and a non-display area NDA. The display area DA may include data lines, scan lines, voltage supply lines, and a plurality of pixels connected to the data lines and the scan lines, and an image may be displayed in the display area DA. For example, the scan lines may extend in a first direction X and be spaced apart from each other in a second direction Y that crosses the first direction X. The data lines and the power supply lines may extend in the second direction Y and be spaced apart from each other in the first direction X.

Each of the pixels may be connected to a scan line, a data line, and a power supply line. Each of the pixels may include thin film transistors including a driving transistor and at least one switching transistor, a light emitting element, and a capacitor. Each of the pixels may receive a data voltage through the data line when a scan signal is applied from the scan line, and supply a driving current to the light emitting element according to the data voltage applied to a gate electrode, thereby emitting light.

The non-display area NDA may surround the display area DA at an edge of the display panel 110. According to embodiments, an image is not displayed in the non-display area NDA. At least a portion of the driver integrated circuit 120 may be disposed in the non-display area NDA. The driver integrated circuit 120 is configured to display an image on the display panel 110 by driving the display panel 110. The driver integrated circuit 120 may include a scan driver which applies scan signals to the scan lines and a display driver which applies data voltages to the data lines. For example, the display driver may be disposed at one side of the non-display area NDA.

The display module 100 may further include the storage device 130. The storage device 130 will be described in more detail with reference to FIG. 3.

The optical member 200 may be disposed on the display module 100 in a third direction Z intersecting the first direction X and the second direction Y The optical member 200 may include a plurality of three-dimensional lenses 220. The three-dimensional lenses 220 may be arranged in the first direction X, and each of the three-dimensional lenses 220 may extend in the second direction Y.

The three-dimensional lenses 220 are configured to refract light output from sub-pixels of the display panel 110. Due to the refraction of light, the light output from the sub-pixels of the display panel 110 may form a light field facing a plurality of viewing viewpoints. Accordingly, the viewer can recognize a three-dimensional image corresponding to the light provided to the plurality of viewing viewpoints. As described above, according to the three-dimensional lenses 220, the sub-pixels of the display panel 110 may correspond to a plurality of viewpoints.

In embodiments, at least one alignment mark may be disposed in the non-display area NDA of the display panel 110. The alignment mark of the non-display area NDA is aligned with a flat part 210 of the optical member 200. As a result, the precision of alignment between the display module 100 and the three-dimensional lenses 220 of the optical member 200 can be increased.

In embodiments, the display device 1000 may include at least one of, for example, a liquid crystal display (LCD), a field emission display (FED), a plasma display panel (PDP), and an organic light emitting diode (OLED) display.

Figure 3:
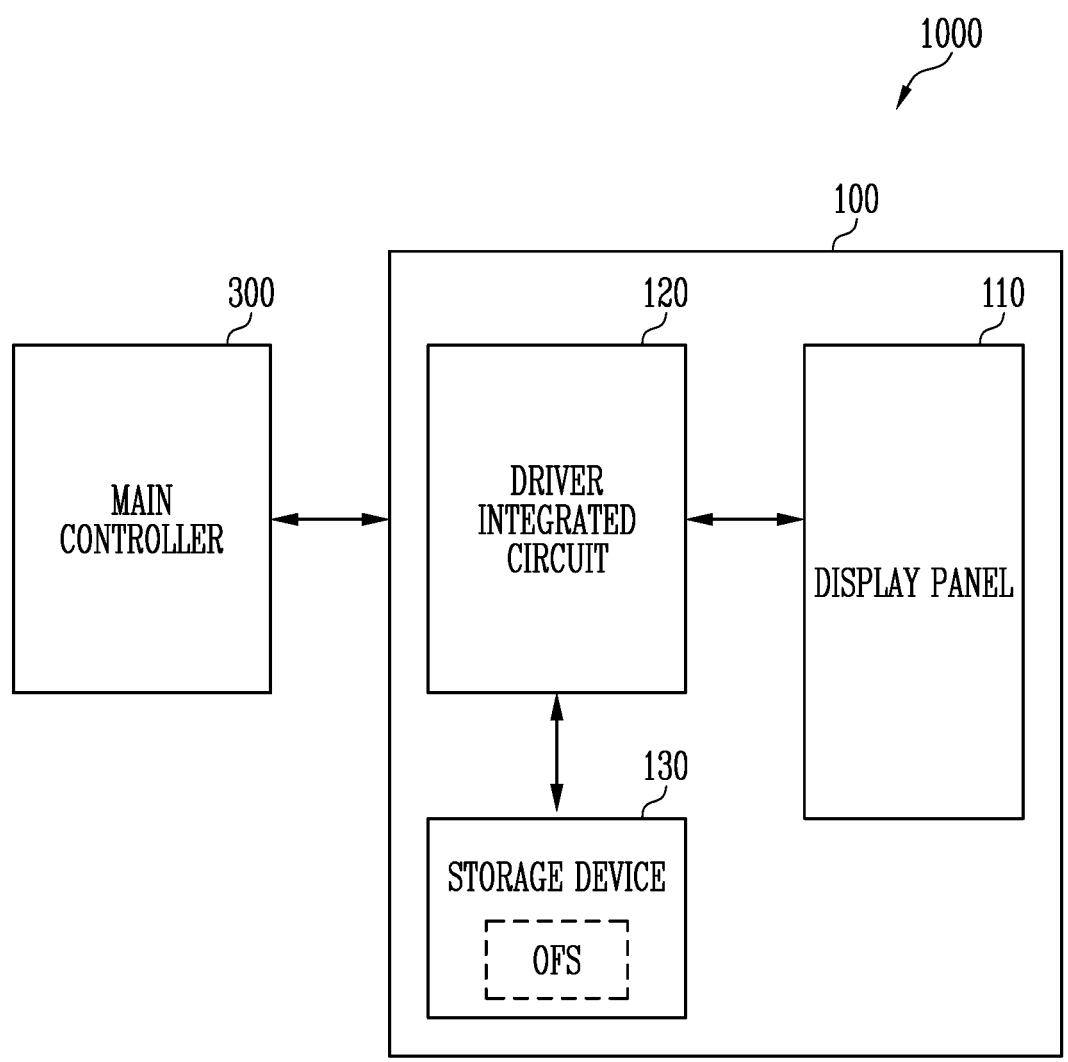
FIG. 3 is a block diagram illustrating an embodiment of the display device shown in FIG. 1.

FIG. 3 is a block diagram illustrating an embodiment of the display device shown in FIG. 1.

Referring to FIG. 3, a display device 1000 may include a display module 100 and a main controller 300. The display module 100 may include a display panel 110, a driver integrated circuit 120, and a storage device 130. The display panel 110 and the driver integrated circuit 120 are described above with reference to FIG. 2, and for convenience of explanation, a further description thereof is omitted.

The storage device 130 may store information of arrangement position coordinates of sub-pixels arranged in the display panel 110, a slope angle of the three-dimensional lenses 220 of the optical member 200, and information of a relative arrangement position between the three-dimensional lenses 220 and the sub-pixels.

When the display device 1000 or the main controller 300 is powered on, the driver integrated circuit 120 may transfer, to the main controller 300, the information of the arrangement position coordinates of the sub-pixels arranged in the display panel 110, the slope angle of the three-dimensional lenses 220 of the optical member 200, and the information of the relative arrangement position between the three-dimensional lenses 220 and the sub-pixels.

The main controller 300 may determine viewing viewpoints of the sub-pixels according to the relative arrangement position between the three-dimensional lenses 220 and the sub-pixels.

The main controller 300 may correct image data input from outside of the main controller 300 according to the position coordinates and the viewing viewpoints of the sub-pixels, thereby generating corrected image data.

The main controller 300 may transfer the corrected image data to the driver integrated circuit 120 of the display module 100 such that the corrected image data is displayed on the display panel 110 of the display module 100.

The driver integrated circuit 120 may read offset data OFS representing a relative arrangement position between the three-dimensional lenses 220 and the sub-pixels from the storage device 130, and provide the read offset data OFS to the main controller 300, under the control of the main controller 300.

The driver integrated circuit 120 may display the corrected image data received from the main controller 300 on the display panel 110.

Figure 4:
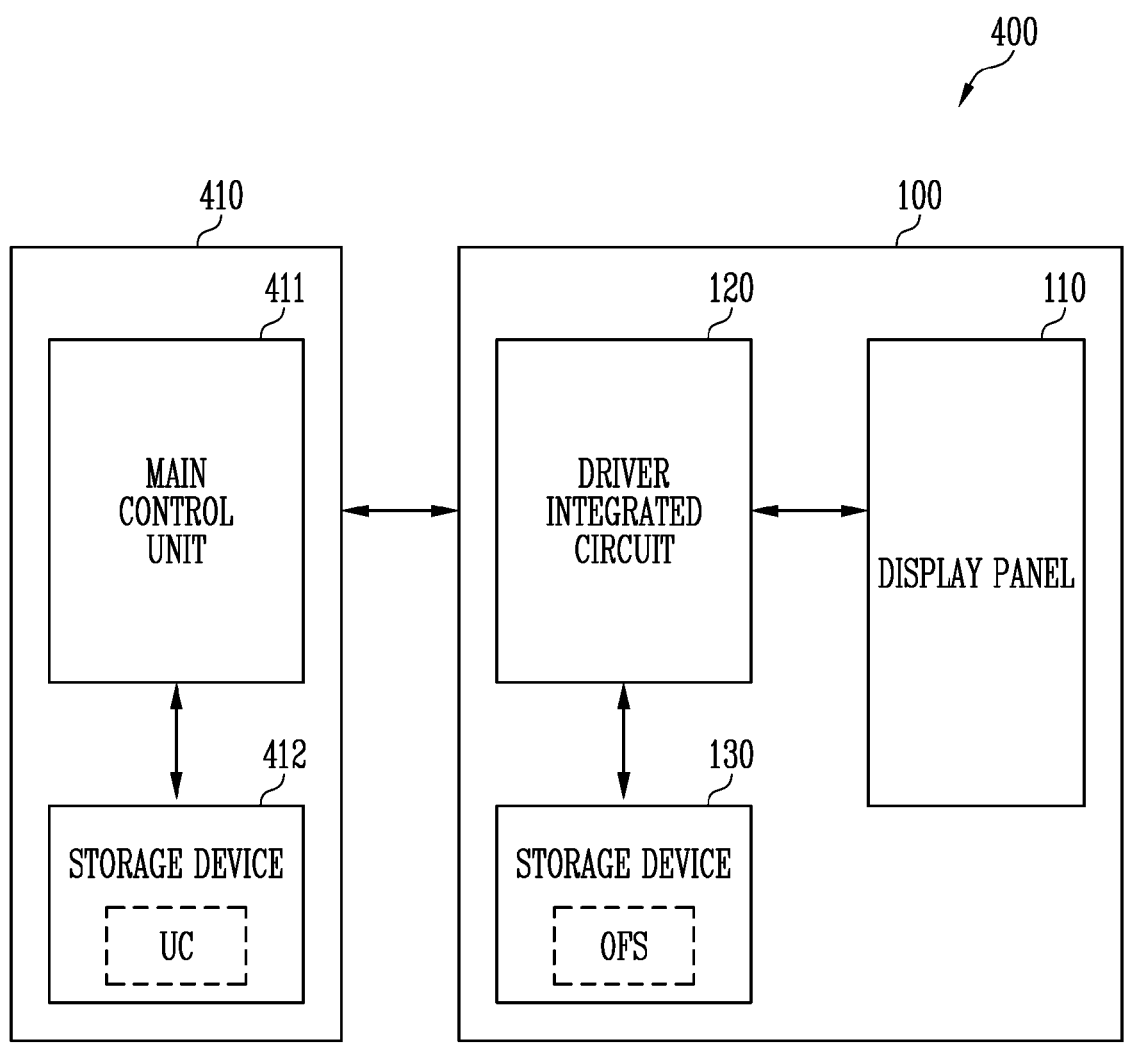
FIG. 4 is a block diagram illustrating an embodiment of the display device shown in FIG. 1.

FIG. 4 is a block diagram illustrating an embodiment of the display device shown in FIG. 1.

Referring to FIG. 4, a display device 400 may include a display module 100 and a main controller 410. The display module 100 may include a display panel 110, a driver integrated circuit 120, and a storage device 130. The display panel 110, the driver integrated circuit 120, and the storage device 130 are described above, and for convenience of explanation, a further description thereof is omitted.

The main controller 410 may include a main control unit 411 and a storage device 412. The main control unit 411 may receive a user correction value UC provided from a user. The main control unit 411 may store the user correction value UC in the storage device 412, and perform an operation of correcting image data, based further on the user correction value UC together with offset data OFS.

Figure 5:
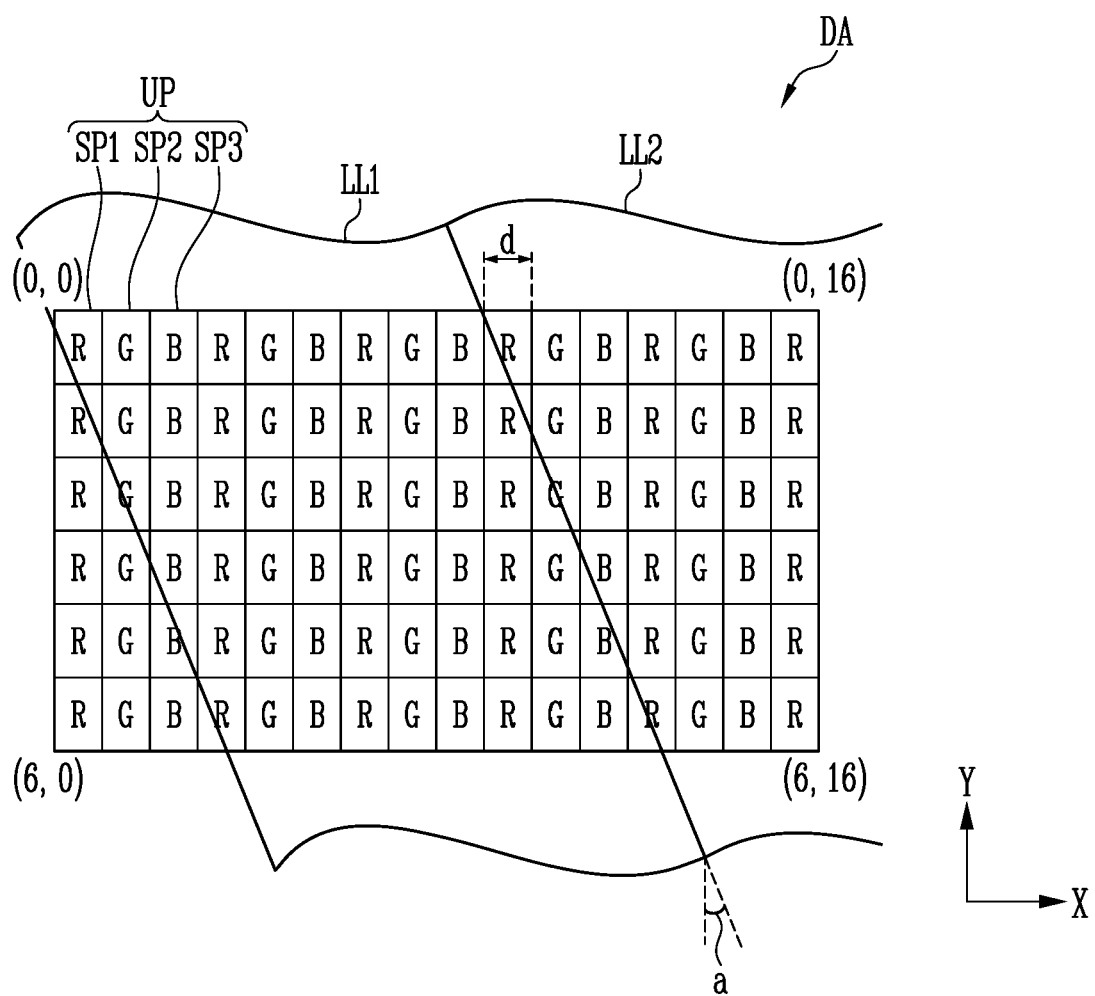
FIG. 5 is a plan view illustrating an embodiment of an arrangement of sub-pixels and three-dimensional lenses in a display area shown in FIG. 1.

FIG. 5 is a plan view illustrating an embodiment of an arrangement of sub-pixels and three-dimensional lenses in the display area shown in FIG. 1.

Referring to FIG. 5, a plurality of unit pixels UP may be arranged and formed in the display area DA of the display panel 110. Each unit pixel UP may include a plurality of sub-pixels SP1, SP2, and SP3. The sub-pixels SP1, SP2, and SP3 may be arranged along a plurality of rows and a plurality of columns. For example, the plurality of sub-pixels SP1, SP2, and SP3 may be arranged and formed in a vertical or horizontal stripe structure. The display area DA of the display panel 110 may include a larger number of unit pixels UP as the resolution of the display device increases.

For example, each of the unit pixels UP may include first to third sub-pixels SP1, SP2, and SP3 which display different colors. The first to third sub-pixels SP1, SP2, and SP3 may be provided by an intersection of n (n is a positive integer) data lines and m (m is a positive integer) scan lines. Each of the plurality of sub-pixels SP1, SP2, and SP3 may include a light emitting element and a pixel circuit. The pixel circuit may include, for example, a driving transistor, at least one switching transistor, and at least one capacitor, and drive the light emitting element of each of the plurality of sub-pixels.

In an embodiment, each of the plurality of unit pixels UP may include one first sub-pixel SP1, two second sub-pixel SP2, and one third sub-pixel SP3, but the present disclosure is not limited thereto. For example, the first sub-pixel SP1 may be a red sub-pixel, the second sub-pixel SP2 may be a green sub-pixel, and the third sub-pixel SP3 may be a blue sub-pixel. Each of the first to third sub-pixels SP1, SP2, and SP3 may receive a data signal including luminance information of red, green or blue light from the display driver, thereby outputting light of a corresponding color.

In FIG. 5, first and second lenses LL1 and LL2 among the three-dimensional lenses 220 shown in FIG. 1 are illustrated. The three-dimensional lenses 220 may be arranged in the first direction X. Each of the three-dimensional lenses 220 may extend in a direction slanted by a predetermined angle a with respect to the second direction Y As described above, the three-dimensional lenses 220 are slanted by the predetermined angle a with respect to the second direction Y As a result, a moiré effect can be prevented from being viewed in an output image of the display device 1000. For example, a moiré effect which may be formed along the second direction Y can be prevented or reduced.

When the optical member 200 is aligned and coupled to the display module 100, an error may occur in the alignment of the optical member 200 and the display module 100 due to various causes. This may mean that a portion of a three-dimensional lens, which each of the unit pixels UP overlaps, is different from an intended portion.

Due to the alignment error, the angle a between the direction in which the three-dimensional lenses 220 extend and the second direction Y may be different from an intended angle. Also, due to the alignment error, the three-dimensional lenses 220 may be shifted by a specific distance d in the first direction X and/or the second direction Y from an intended position.

The offset data OFS shown in FIGS. 3 and 4 may include data representing the angle a between the direction in which the three-dimensional lenses 220 extend and the second direction Y and data representing the distance d by which the three-dimensional lenses 220 are shifted. In embodiments, the angle a between the direction in which the three-dimensional lenses 220 extend and the second direction Y and the distance d by which the three-dimensional lenses 220 are shifted may be measured in a test process after a manufacturing process of the display device 1000, and a measured result may be provided as the offset data OFS. The offset data OFS may utilize a relatively small number of data bits, and therefore, a relatively small storage space may be utilized to store the offset data OFS.

Figure 6:
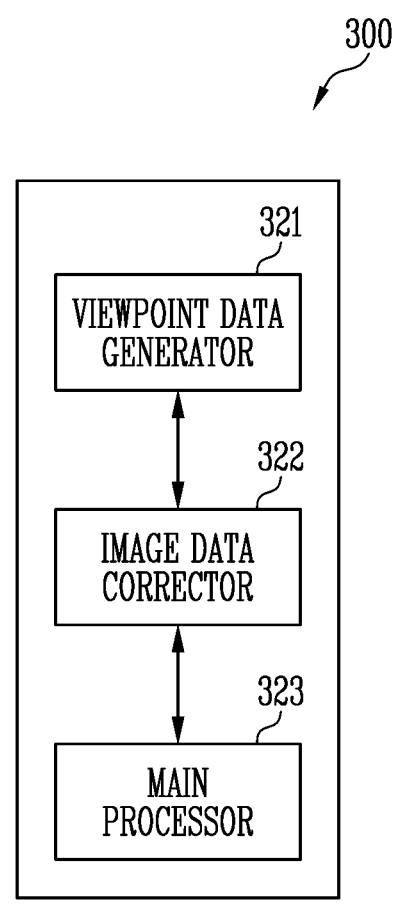
FIG. 6 is a block diagram illustrating an embodiment of a main controller shown in FIG. 3.

FIG. 6 is a block diagram illustrating an embodiment of the main controller shown in FIG. 3.

Referring to FIGS. 3 and 6, a main controller 300 may include a viewpoint data generator 321 (also referred to as a viewpoint data generator circuit), an image data corrector 322 (also referred to as an image data corrector circuit), and a main processor 323.

The viewpoint data generator 321 may be configured to generate viewing viewpoints of the sub-pixels, based on the offset data OFS shown in FIG. 3. In other words, the viewpoint data generator 321 may set viewing viewpoints (or viewing viewpoint numbers) of the sub-pixels according to a relative arrangement position between the three-dimensional lenses 220 represented by the offset data OFS and the sub-pixels. As described with reference to FIG. 5, the offset data OFS may include data representing the angle a between the direction in which the three-dimensional lenses 220 extend and the second direction Y and data representing the distance d by which the three-dimensional lenses 220 are shifted. It may be understood that the relative arrangement position between the three-dimensional lenses 220 and the sub-pixels is defined according to the angle a between the direction in which the three-dimensional lenses 220 extend and the second direction Y and the distance d by which the three-dimensional lenses 220 are shifted.

The image data corrector 322 may generate corrected image data by correcting image data input from the outside of the image data corrector 322 according to position coordinates and the viewing viewpoints of the sub-pixels. For example, according to the position coordinates and the viewing viewpoints of the sub-pixels, the image data corrector 322 may determine position coordinates at which data pixels of image data intended to be visualized at specific viewing viewpoints are to be shifted, generate a mapping table representing the position coordinates to be shifted, and shift the data pixels of the input image data, based on the generated mapping table. For example, the image data corrector 322 may correct an arrangement position and an alignment state for each horizontal line of the input image data.

The main processor 323 may transfer the corrected image data to the driver integrated circuit 120 of the display module 100 such that the corrected image data is displayed on the display panel 110 of the display module 100.

Figure 7:
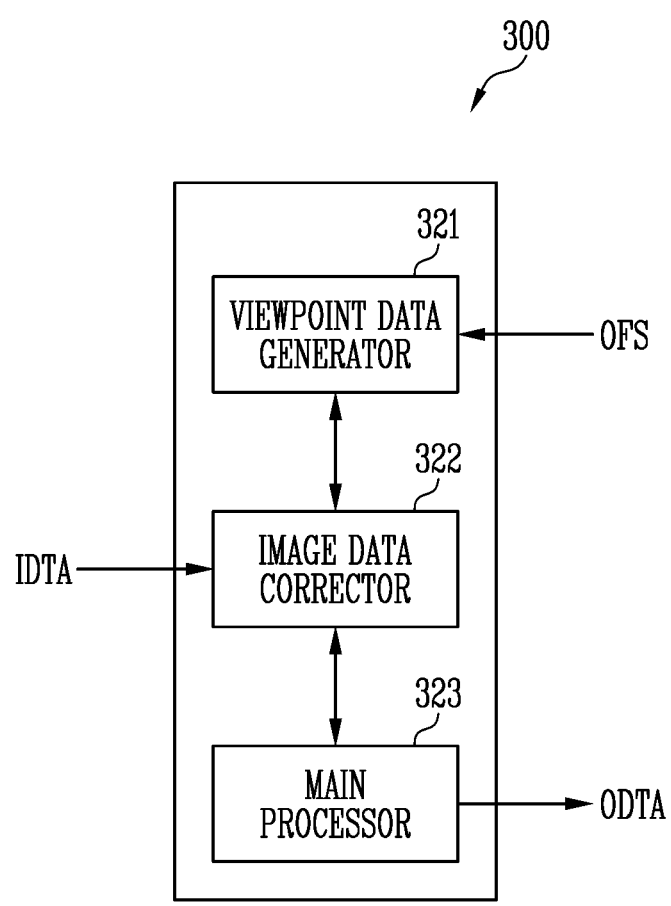
FIG. 7 is a block diagram illustrating an embodiment of signals processed in the main controller shown in FIG. 6.

FIG. 7 is a block diagram illustrating an embodiment of signals processed in the main controller shown in FIG. 6.

Referring to FIGS. 3 and 7, the viewpoint data generator 321 of the main controller 300 may set viewing viewpoints of the sub-pixels according to a relative arrangement position between the three-dimensional lenses 220 and the sub-pixels by using offset data OFS stored in the storage device 130 of the display module 100.

The image data corrector 322 may generate corrected image data by correcting image data received as input data IDTA according to position coordinates and the viewing viewpoints of the sub-pixels.

The main processor 323 may transfer the corrected image data as output data ODTA to the driver integrated circuit 120 of the display module 100 such that the corrected image data is displayed on the display panel 110.

Figure 8:
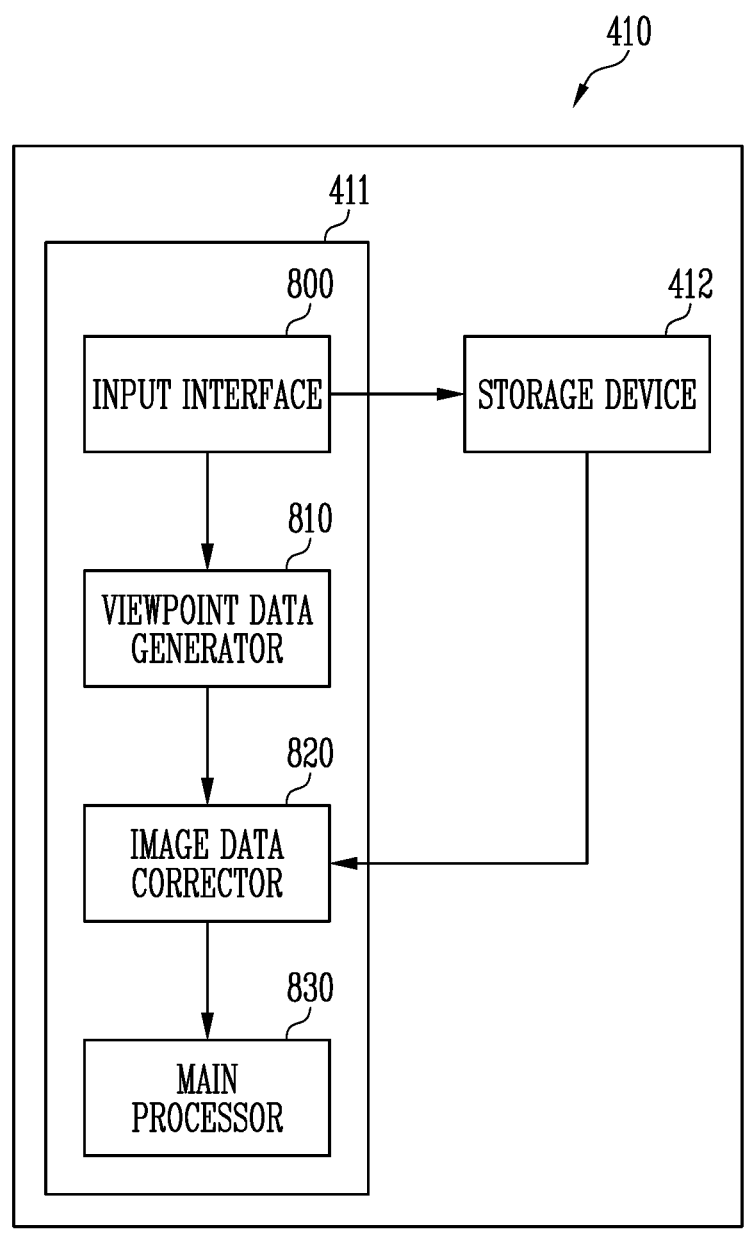
FIG. 8 is a block diagram illustrating an embodiment of a main controller shown in FIG. 4.

FIG. 8 is a block diagram illustrating an embodiment of the main controller shown in FIG. 4.

Referring to FIGS. 4 and 8, a main controller 410 may include a main control unit 411 and a storage device 412.

The main control unit 411 may include an input interface 800, a viewpoint data generator 810, an image data corrector 820, and a main processor 830.

The input interface 800 may be configured to receive a user input provided from a user. The input interface 800 may receive a user correction value UC associated with offset data OF S as the user input, and store the user correction value UC in the storage device 412. In embodiments, the display panel 110 may be controlled to display a predetermined pattern, and the user may check whether the corresponding pattern is slanted, rotated or shifted and then provide a user input. The user input may be received as the user correction value UC through the input interface 800. The user correction value UC may be received while the predetermined pattern is displayed on the display panel 110.

The storage device 412 shown in FIG. 8 may be provided as the storage device 412 shown in FIG. 4.

The viewpoint data generator 810 may be configured identically to the viewpoint data generator 321 shown in FIG. 6. For example, the viewpoint data generator 810 may determine viewing viewpoints of the sub-pixels according to the offset data OFS representing a relative arrangement position between the three-dimensional lenses 220 and the sub-pixels.

The image data corrector 820 may generate corrected image data by correcting an arrangement position and an alignment state for each horizontal line of image data input from outside of the image data corrector 820 according to position coordinates and the viewing viewpoints of the sub-pixels. The image data corrector 820 may generate the corrected image data by performing additional correction based on the user correction value UC stored in the storage device 412.

The main processor 830 may transfer the corrected image data to the driver integrated circuit 120 of the display module 100 such that the corrected image data is displayed on the display panel 110 of the display module 100.

Figure 9:
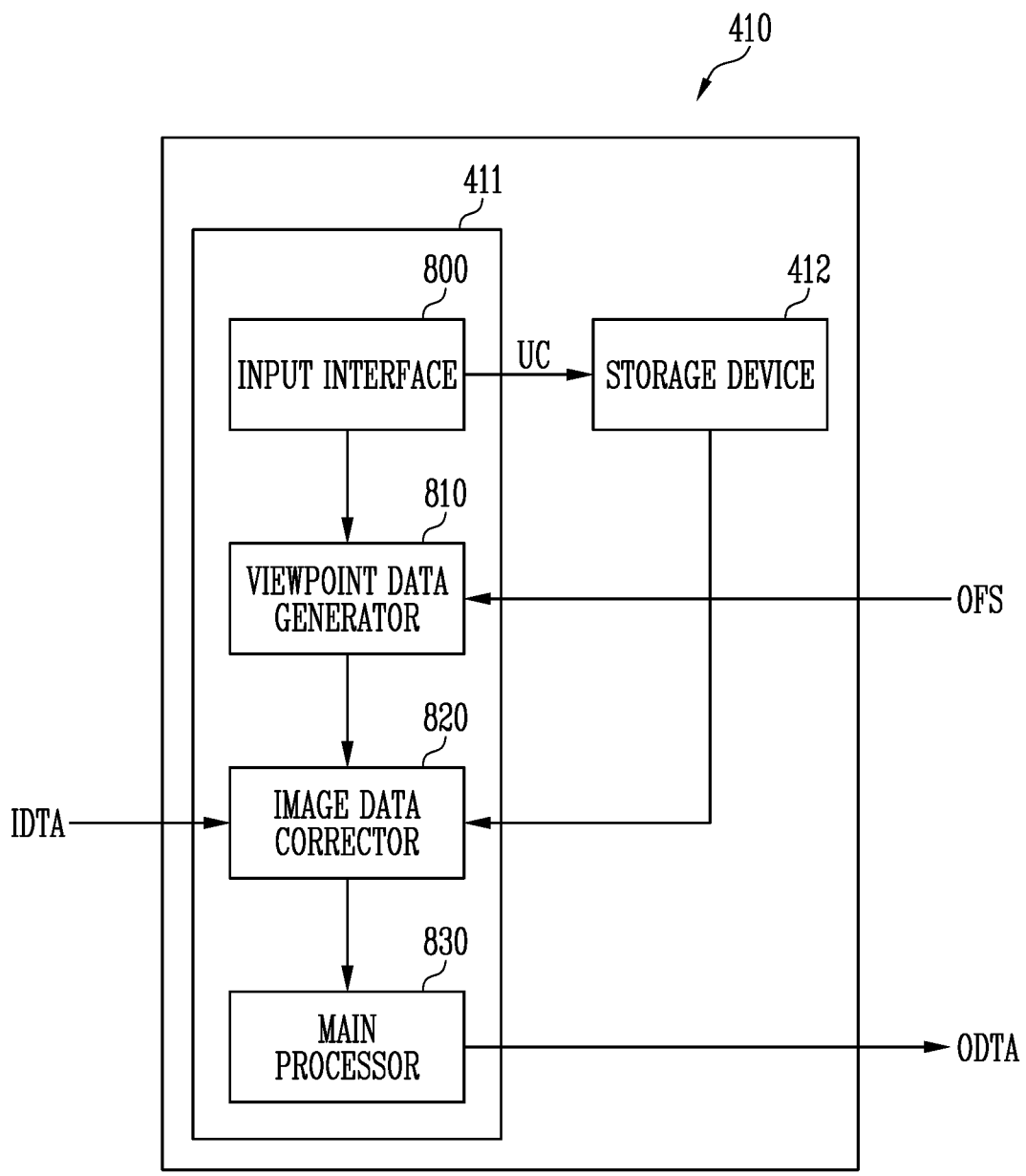
FIG. 9 is a block diagram illustrating an embodiment of signals processed in the main controller shown in FIG. 8.

FIG. 9 is a block diagram illustrating an embodiment of signals processed in the main controller shown in FIG. 8.

Referring to FIGS. 4 and 9, the input interface 800 may receive a user correction value UC and store the user correction value UC in the storage device 412. The viewpoint data generator 810 may determine viewing viewpoints of the sub-pixels according to a relative arrangement position between the three-dimensional lenses 220 and the sub-pixels, which is represented by offset data OFS.

The image data corrector 820 may generate corrected image data by correcting an arrangement position and an alignment state for each horizontal line of image data received as input data IDTA according to position coordinates and the viewing viewpoints of the sub-pixels and the user correction value UC. For example, the image data corrector 820 may determine position coordinates at which data pixels of image data intended to be visualized at specific viewing viewpoints are to be shifted. The image data corrector 820 may calculate position coordinates at which the data pixels are to be additionally shifted according to the user correction value UC, generate a mapping table representing the position coordinates to be shifted, and shift the data pixels of the input image data, based on the generated mapping table.

The main processor 830 may transfer the corrected image data as output data ODTA to the driver integrated circuit 120 of the display module 100 such that the corrected image data is displayed on the display panel 110.

FIG. 10 is a flowchart illustrating an embodiment of a driving method of the main controller shown in FIG. 3.

Referring to FIGS. 3 and 10, in operation S100, in a power-on mode, the main controller 300 may access the storage device 130 of the display module 100. Herein, the power-on mode refers to a state in which the display device 1000 is powered on. The storage device 130 may store offset data representing a relative arrangement position between the three-dimensional lenses 220 and the sub-pixels, which are illustrated in FIG. 1.

In operation S110, the main controller 300 may receive offset data OFS from the storage device 130 of the display module 100. In operation S120, the main controller 300 may determine viewing viewpoints of the sub-pixels by using the offset data OFS.

In operation S130, the main controller 300 may generate corrected image data by correcting an arrangement position and an alignment state for each horizontal line of image data according to position coordinates and the viewing viewpoints of the sub-pixels.

In operation S140, the main controller 300 may transfer the corrected image data to the driver integrated circuit 120 of the display module 100 such that a three-dimensional image according to the corrected image data is displayed.

FIG. 11 is a flowchart illustrating an embodiment of a driving method of the main controller shown in FIG. 4.

Referring to FIGS. 4, 8, and 11, in operation S200, the main controller 410 may receive a user correction value UC through the input interface 800, and store the received user correction value UC in the storage device 412.

In operation S210, the main controller 410 may access the storage device 130 of the display module 100 in a power-on mode. In operation S220, the main controller 410 may receive offset data OFS from the storage device 130 of the display module 100. The offset data OFS may represent a relative arrangement position between the three-dimensional lenses 220 and the sub-pixels.

In operation S230, the main controller 410 may determine viewing viewpoints of the sub-pixels by using the offset data OFS.

In operation S240, the main controller 410 may generate corrected image data by correcting an arrangement position and an alignment state for each horizontal line of received image data, based on position coordinates and the viewing viewpoints of the sub-pixels and the user correction value UC.

In operation S250, the main controller 410 may transfer the corrected image data to the driver integrated circuit 120 of the display module 100 such that a three-dimensional image according to the corrected image data is displayed.

In accordance with embodiments of the present disclosure, a display device capable of displaying a three-dimensional image with increased reliability, and a method of operating the display device, may be provided.

As is traditional in the field of the present disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the present disclosure has been particularly shown and described with reference to embodiments thereof, it will be understood by those of ordinary skill in the art that various changes in form and detail may be made therein without departing from the spirit and scope of the present disclosure as defined by the following claims.

What is claimed is:

1. An electronic device, comprising:
an optical member comprising a plurality of three-dimensional lenses;
a display module coupled to the optical member,
wherein the display module comprises a display panel comprising a plurality of sub-pixels and a storage device configured to store offset data measured during a post-manufacturing test process, the offset data representing a physical misalignment in a relative arrangement position between the three-dimensional lenses and the sub-pixels; and
a main controller configured to receive the offset data from the display module by accessing the display module in a power-on mode, and correct image data to be provided to the display module, based on the offset data.

2. The electronic device of claim 1, further comprising:
an additional storage device disposed outside of the display module and connected to the main controller,
wherein the main controller comprises an input interface through which a user correction value is received from a user, and
wherein the main controller stores the user correction value in the additional storage device, and corrects the image data, based further on the user correction value.

3. The electronic device of claim 2, wherein the main controller receives the user correction value through the input interface while the display panel displays an image.

4. The electronic device of claim 1, wherein the main controller is further configured to calculate viewing viewpoints of the sub-pixels according to the offset data,
generate corrected image data by correcting the image data according to position coordinates and the viewing viewpoints of the sub-pixels, and
transfer the corrected image data to the display module such that a three-dimensional image according to the corrected image data is displayed on the display panel.

5. The electronic device of claim 1, wherein the sub-pixels are arranged in a first direction and a second direction intersecting the first direction, and
wherein the offset data comprises, as the relative arrangement position, a slope angle of the three-dimensional lenses with respect to the first direction and a distance by which the three-dimensional lenses are shifted from a reference position.

6. The electronic device of claim 1, wherein the main controller is further configured to calculate viewing viewpoints of the sub-pixels according to the relative arrangement position,
generate corrected image data by correcting the image data according to position coordinates and the viewing viewpoints of the sub-pixels, and
transfer the corrected image data to the display module.

7. A method of operating a display device comprising a plurality of sub-pixels, the method comprising:
accessing a storage device of a display module which stores offset data,
wherein the offset data is measured during a post-manufacturing test process, and represents a physical misalignment in a relative arrangement position between a plurality of three-dimensional lenses and the sub-pixels in a power-on mode;
receiving the offset data from the display module;
correcting image data to be provided to the display module, based on the offset data, and
displaying a three-dimensional image according to the corrected image data by transferring the corrected image data to the display module.

8. The method of claim 7, further comprising:
receiving a user correction value associated with the offset data from a user; and
storing the user correction value,
wherein correcting the image data is further based on the user correction value.

9. The method of claim 8, wherein the user correction value is received while the sub-pixels display an image.

10. The method of claim 7, wherein the sub-pixels are arranged in a first direction and a second direction intersecting the first direction, and
wherein the offset data comprises, as the relative arrangement position, a slope angle of the three-dimensional lenses with respect to the first direction and a relative position of the three-dimensional lenses with respect to the sub-pixels.

11. The method of claim 7, wherein correcting the image data comprises:
calculating viewing viewpoints of the sub-pixels according to the relative arrangement position; and
generating the corrected image data by correcting the image data according to position coordinates and the viewing viewpoints of the sub-pixels.

12. The method of claim 7, wherein the three-dimensional image is displayed by applying data voltages corresponding to the corrected image data to the sub-pixels.

13. A method of displaying a three-dimensional image on a display device, the method comprising:
obtaining image data;
correcting the image data based on offset data,
wherein the offset data is measured during a post-manufacturing test process, and represents a physical misalignment in a relative arrangement position between a plurality of three-dimensional lenses of the display device and a plurality of sub-pixels of the display device when the display device is powered on; and
displaying the three-dimensional image according to the corrected image data.

14. The method of claim 13, further comprising:
receiving a user correction value associated with the offset data from a user; and
storing the user correction value,
wherein correcting the image data is further based on the user correction value.

15. The method of claim 14, wherein the user correction value is received while the sub-pixels display an image.

16. The method of claim 14, wherein the three-dimensional image is displayed by applying data voltages corresponding to the corrected image data to the sub-pixels.

17. The method of claim 13, wherein the sub-pixels are arranged in a first direction and a second direction intersecting the first direction, and
wherein the offset data comprises, as the relative arrangement position, a slope angle of the three-dimensional lenses with respect to the first direction and a relative position of the three-dimensional lenses with respect to the sub-pixels.

18. The method of claim 13, wherein correcting the image data comprises:
   calculating viewing viewpoints of the sub-pixels according to the relative arrangement position; and
   generating the corrected image data by correcting the image data according to position coordinates and the viewing viewpoints of the sub-pixels.

* * * * *